United States Patent
Wu

(10) Patent No.: US 11,561,295 B2
(45) Date of Patent: Jan. 24, 2023

(54) POSITION DETECTING METHOD, DEVICE AND STORAGE MEDIUM FOR VEHICLE LADAR

(71) Applicant: BEIJING BAIDU NETCOM SCIENCE TECHNOLOGY CO., LTD., Beijing (CN)

(72) Inventor: Nan Wu, Beijing (CN)

(73) Assignee: BEIJING BAIDU NETCOM SCIENCE TECHNOLOGY CO., LTD.

( * ) Notice: Subject to any disclaimer, the term of this patent is extended or adjusted under 35 U.S.C. 154(b) by 94 days.

(21) Appl. No.: 17/240,142

(22) Filed: Apr. 26, 2021

(65) Prior Publication Data
US 2021/0263138 A1 Aug. 26, 2021

Related U.S. Application Data

(63) Continuation of application No. 16/726,821, filed on Dec. 24, 2019, now Pat. No. 11,086,001.

(30) Foreign Application Priority Data

Dec. 26, 2018 (CN) .......................... 201811598528.8

(51) Int. Cl.
*G01S 7/00* (2006.01)
*G01S 17/89* (2020.01)
(Continued)

(52) U.S. Cl.
CPC ............ *G01S 7/4972* (2013.01); *G01S 17/89* (2013.01); *G01S 17/931* (2020.01); *G06T 7/521* (2017.01); *G06T 2207/10028* (2013.01)

(58) Field of Classification Search
CPC ..... G01S 7/4972; G01S 17/931; G06T 7/521; G06T 2207/10028
(Continued)

(56) References Cited

U.S. PATENT DOCUMENTS

2009/0060345 A1  3/2009 Wheeler
2018/0275252 A1  9/2018 Fried
(Continued)

FOREIGN PATENT DOCUMENTS

CN  106405555 A  2/2017
CN  107024687 A  8/2017
(Continued)

OTHER PUBLICATIONS

Xiangrui, Tian et al., Calibration of installation angles for mobile LiDAR scanner system, Infrared and Laser Engineering, Oct. 2014, vol. 43, No. 10, pp. 3293-3297.
(Continued)

*Primary Examiner* — Jeffery A Williams
(74) *Attorney, Agent, or Firm* — Dilworth IP, LLC

(57) ABSTRACT

The present application provides a position detecting method, device and storage medium for a vehicle ladar, where the method includes: detecting, through a ladar disposed on an autonomous vehicle, detection data of at least one wall of an interior room in which the autonomous vehicle is located, obtaining a point cloud image according to the detection data of the at least one wall, and judging, according to the point cloud image, whether an installation position of the ladar is accurate. According to the technical solution, it is possible to accurately detect whether the installation position of the ladar is accurate, provide a prerequisite for calibration of the installation position of the ladar, and improve detection accuracy of the ladar for obstacles around the autonomous vehicle.

9 Claims, 6 Drawing Sheets

(51) Int. Cl.
  *G01S 7/497* (2006.01)
  *G06T 7/521* (2017.01)
  *G01S 17/931* (2020.01)

(58) Field of Classification Search
  USPC .......................................................... 348/148
  See application file for complete search history.

(56) References Cited

U.S. PATENT DOCUMENTS

2019/0064333 A1    2/2019  Wu
2019/0204425 A1*   7/2019  Abari ..................... G01S 7/497
2019/0353786 A1   11/2019  Wei

FOREIGN PATENT DOCUMENTS

CN    107247268 A    10/2017
CN    108710120 A    10/2018
JP    2007298303 A   11/2007

OTHER PUBLICATIONS

First Office Action issued in CN Patent Application No. 201811598528.8 dated May 13, 2020.
Second Office Action issued in CN Patent Application No. 201811598528.8 dated Mar. 1, 2021.

* cited by examiner

POSITION DETECTING METHOD, DEVICE AND STORAGE MEDIUM FOR VEHICLE LADAR

CROSS-REFERENCE TO RELATED APPLICATION

This application is a continuation of U.S. patent application No. U.S. Ser. No. 16/726,821, filed on Dec. 24, 2019, which claims priority to Chinese Patent Application No. 201811598528.8, filed on Dec. 26, 2018. The afore-mentioned patent applications are hereby incorporated by reference in their entireties.

TECHNICAL FIELD

The present application relates to the field of autonomous driving technology, and in particular, to a position detecting method, device and storage medium for a vehicle ladar.

BACKGROUND

Ladar is one of the most powerful sensors in unmanned vehicles. It can detect a target position, speed and other features by emitting a laser beam, and has characteristics of high measurement accuracy and good directionality, playing an important role in the field of autonomous driving.

In the prior art, the ladar is installed on an autonomous vehicle, which may be configured to detect obstacles around the autonomous vehicle, and provide a reference for safe driving of the autonomous vehicle. However, the ladar is easily skewed during installation and, therefore, position detection for the installed ladar is required.

SUMMARY

The present application provides a position detecting method, device and storage medium for a vehicle ladar to overcome the problem in the prior art that the ladar is easily skewed during installation.

In a first aspect of the present application, provided is a position detecting method for a vehicle ladar, including:

detecting, through a ladar disposed on an autonomous vehicle, detection data of at least one wall of an interior room in which the autonomous vehicle is located;

obtaining, according to the detection data of the at least one wall, a point cloud image; and judging, according to the point cloud image, whether an installation position of the ladar is accurate.

In a possible design of the first aspect, before the judging, according to the point cloud image, whether the installation position of the ladar is accurate, the method includes:

presenting the point cloud image in a visualization interface.

In another possible design of the first aspect, the judging, according to the point cloud image, whether the installation position of the ladar is accurate includes:

judging whether each wall shown in the point cloud image is parallel to a boundary of the visualization interface on the same side as the wall;

determining that the installation position of the ladar is accurate if each wall shown by the point cloud image is parallel to the boundary of the visualization interface on the same side as the wall; and determining that the installation position of the ladar is inaccurate if there is a wall among all walls shown by the point cloud image that is not parallel to the boundary of the visualization interface on the same side as the wall.

In still another possible design of the first aspect, the judging, according to the point cloud image, whether the installation position of the ladar is accurate includes:

obtaining spacings between adjacent concentric circles of a plurality of concentric circles formed by point clouds in the point cloud image;

judging whether the spacings between the adjacent concentric circles of the plurality of concentric circles are consistent;

determining that the installation position of the ladar is accurate if the spacings between the adjacent concentric circles of the plurality of concentric circles are consistent; and determining that the installation position of the ladar is inaccurate if the spacings between the adjacent concentric circles of the plurality of concentric circles are inconsistent.

In still another possible design of the first aspect, after the judging, according to the point cloud image, whether the installation position of the ladar is accurate, the method further includes:

if it is determined that the installation position of the ladar is inaccurate, adjusting a rotation axis of the ladar to calibrate the installation position of the ladar.

In a second aspect of the present application, provided is a position detecting device for a vehicle ladar, including: a detecting module, an obtaining module and a judging module;

where the detecting module is configured to detect, through a ladar disposed on an autonomous vehicle, detection data of at least one wall of an interior room in which the autonomous vehicle is located;

the obtaining module is configured to obtain, according to the detection data of the at least one wall, a point cloud image; and the judging module is configured to judge, according to the point cloud image, whether an installation position of the ladar is accurate.

In a possible design of the second aspect, the device further includes: a presenting module;

where the presenting module is configured to: before the judging module judges, according to the point cloud image, whether the installation position of the ladar is accurate, present the point cloud image in a visualization interface.

In another possible design of the second aspect, the judging module includes: a first judging unit and a first determining unit;

the first judging unit is configured to judge whether each wall shown by the point cloud image is parallel to a boundary of the visualization interface on the same side as the wall; and the first determining unit is configured to determine that the installation position of the ladar is accurate when each wall shown in the point cloud image is parallel to the boundary of the visualization interface on the same side as the wall, and determine that the installation position of the ladar is inaccurate when there is a wall among all walls shown by the point cloud image that is not parallel to the boundary of the visualization interface on the same side as the wall.

In still another possible design of the second aspect, the judging module includes: an obtaining unit, a second judging unit and a second determining unit;

the obtaining unit is configured to obtain spacings between adjacent concentric circles of a plurality of concentric circles formed by point clouds in the point cloud image;

the second judging unit is configured to judge whether the spacings between the adjacent concentric circles of the plurality of concentric circles are consistent; and the second determining unit is configured to determine that the installation position of the ladar is accurate when the spacings between the adjacent concentric circles of the plurality of concentric circles are consistent, and determine that the installation position of the ladar is inaccurate when the spacings between the adjacent concentric circles of the plurality of concentric circles are inconsistent.

In still another possible design of the second aspect, the device further includes: a calibrating module;

where the calibrating module is configured to: after the judging module judges, according to the point cloud image, whether the installation position of the ladar is accurate, adjust a rotation axis of the ladar to calibrate the installation position of the ladar if it is determined that the installation position of the ladar is inaccurate.

In a third aspect of the present application, provided is a position detecting device for a vehicle ladar, including a processor, a memory and a computer program stored on the memory and executable on the processor, where the processor, when executing the program, implements the method as described above according to the first aspect and various possible designs of the first aspect.

In a fourth aspect of the present application, provided is a storage medium having stored therein an instruction which, when executable on a computer, causes the computer to perform the method as described above according to the first aspect and various possible designs of the first aspect.

In a fifth aspect of the present application, provided is a chip for running an instruction, where the chip is configured to perform the method as described above according to the first aspect and various possible designs of the first aspect.

The position detecting method, device and storage medium for the vehicle ladar provided in embodiments of the present application allow for detecting, through a ladar disposed on an autonomous vehicle, detection data of at least one wall of an interior room in which the autonomous vehicle is located, obtaining a point cloud image according to the detection data of the at least one wall, and finally judging, according to the point cloud image, whether an installation position of the ladar is accurate, thus it is possible to accurately detect whether the installation position of the ladar is accurate, provide a prerequisite for calibration of the installation position of the ladar, and improve detection accuracy of the ladar for obstacles around the autonomous vehicle.

DESCRIPTION OF EMBODIMENTS

In order to describe the purpose, technical solutions and advantages of the embodiments of the present application more clearly, the technical solutions in the embodiments of the present application are clearly and completely described in the following with reference to the accompanying drawings in the embodiments of the present application. Obviously, the described embodiments are part of the embodiments of the present application, rather than all of them. All other embodiments obtained by a person of ordinary skill in the art based on the embodiments of the present application without creative efforts are within the scope of the present application.

Figure 1:
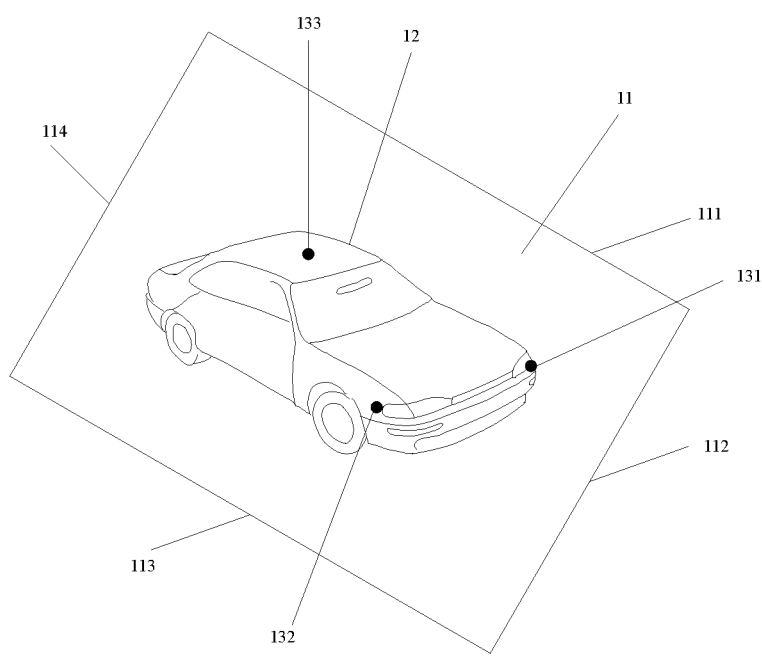
FIG. 1 is a schematic diagram illustrating an application scenario of a position detecting method for a vehicle ladar according to an embodiment of the present application.

A position detecting method for a vehicle ladar provided in the following embodiments of the present application can be applied to an interior room. FIG. 1 is a schematic diagram illustrating an application scenario of a position detecting method for a vehicle ladar according to an embodiment of the present application. As shown in FIG. 1, the position detecting method for the vehicle ladar may have an application scenario including: an autonomous vehicle 12 parked within an interior room 11 and at least one ladar disposed on the autonomous vehicle 12.

Exemplarily, as shown in FIG. 1, the interior room 11 may refer to a space having walls on four sides, in other words, the interior room 11 has a left wall 111, a front wall 112, a right wall 113, and a rear wall 114. The orientation of each wall is an exemplary description; the naming of each wall is not limited in the present embodiment, which can be determined according to actual conditions.

Optionally, the number of ladars disposed on the autonomous vehicle 12 may be three. For example, a first ladar 131 is disposed on the left front side of the autonomous vehicle 12, a second ladar 132 is disposed on the right front side of the autonomous vehicle 12, a third ladar 133 is disposed in the middle of the roof of the autonomous vehicle 12, and the number of ladars installed on the autonomous vehicle 12 is not limited in the present embodiment.

In the present embodiment, "first", "second", and "third" are merely expression methods, only to distinguish a plurality of different ladars, moreover, the order of each ladar is not limited in the present embodiment, and each ladar may have other names, which are not described herein again.

In the present embodiment, each of the at least one ladar disposed on the autonomous vehicle can detect at least one wall of the interior room 11.

For example, the first ladar 131 disposed on the left front side of the autonomous vehicle 12 may detect the left wall 111, the front wall 112, and an angle between the left wall 111 and the front wall 112 of the interior room 11. The second ladar 132 disposed on the right front side of the autonomous vehicle 12 may detect the right wall 113, the front wall 112, and an angle between the right wall 113 and the front wall 112 of the interior room 11. The third ladar 133 disposed in the middle of the roof of the autonomous vehicle 12 may detect the left wall 111, the front wall 112, the right wall 113, and the rear wall 114 of the interior room 11.

It should be noted that a fourth ladar may be disposed on the rear side of the autonomous vehicle 12, and the fourth ladar may detect the rear wall 114 of the interior room 11 and the like.

It should be noted that the number of ladars disposed on the autonomous vehicle 12 and their installation positions, together with the number of walls and their orientations the ladars can detect are not limited in the present embodiment, any configuration may be used as long as they can realize detection of surrounding obstacles, and can avoid traffic accidents to some extent. The number of ladars and their installation positions together with the number of walls and their orientations the ladars can detect can be determined based on the configuration of each autonomous vehicle.

Optionally, description is made by taking an example where the position detecting method for the vehicle ladar as shown in FIG. 1 may have an application scenario including the interior room 11, the autonomous vehicle 12, the at least one ladar, and the like. It should be noted that, the application scenario may also include devices such as a device that is deployed in the interior room, and other sensing device that is disposed on the autonomous vehicle. A specific composition of the application scenario of the position detecting method for the vehicle ladar is not limited in the embodiment of the present application, and may be limited according to actual conditions.

In view of the problem in the prior art that the ladar of the autonomous vehicle is easily skewed during installation, the embodiments of the present application provide a position detecting method, device and storage medium for a vehicle ladar, which allow for detecting, through a ladar disposed on an autonomous vehicle, detection data of at least one wall of an interior room in which the autonomous vehicle is located, obtaining a point cloud image according to the detection data of the at least one wall, and finally judging, according to the point cloud image, whether an installation position of the ladar is accurate, thus it is possible to accurately detect whether the installation position of the ladar is accurate, provide a prerequisite for calibration of the installation position of the ladar, and improve detection accuracy of the ladar for obstacles around the autonomous vehicle.

The technical solutions of the present application are described in detail below by way of specific embodiments. It should be noted that the following specific embodiments may be combined with each other, and the same or similar concepts or processes may not be described in some embodiments.

Figure 2:
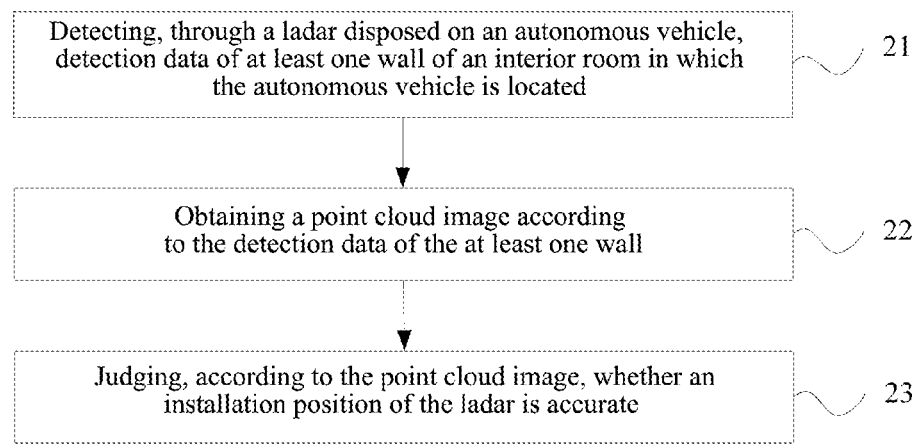
FIG. 2 is a schematic flowchart illustrating a first embodiment of a position detecting method for a vehicle ladar according to an embodiment of the present application.

FIG. 2 is a schematic flowchart illustrating a first embodiment of a position detecting method for a vehicle ladar according to an embodiment of the present application. The position detecting method for the vehicle ladar can be applied to an autonomous vehicle. As shown in FIG. 2, the position detecting method for the vehicle ladar may include the following steps:

Step 21: detecting, through a ladar disposed on an autonomous vehicle, detection data of at least one wall of an interior room in which the autonomous vehicle is located.

Exemplarily, in the present embodiment, if there is a desire to determine whether the installation position of the ladar on the autonomous vehicle is accurate, the autonomous vehicle is first controlled to enter the interior room. Optionally, the interior room may be a space having the left wall 111, the front wall 112, the right wall 113, and the rear wall 114 in the application scenario shown in FIG. 1.

In the present embodiment, when the autonomous vehicle is parked in the interior room, a laser beam is emitted by the ladar disposed on the autonomous vehicle, and the laser beam is used to detect the detection data of the at least one wall of the interior room in which the autonomous vehicle is located.

For example, description will be made by taking the first ladar disposed on the left front side of the autonomous vehicle as an example. Since the first ladar can detect the left wall and the front wall of the interior room, the first ladar is used to detect detection data of the left wall and the front wall of the interior room. It can be understood that, in the present embodiment, the first ladar is used to only detect the detection data of the left wall or the front wall, with regard to detecting detection data of which wall, details is not described herein again.

Similarly, detection data of the right wall and/or the front wall of the interior room can be detected by the second ladar disposed in the right front of the autonomous vehicle, and detection data of the left wall and/or the right wall and/or the front wall and/or the rear wall of the interior room can be detected by the third ladar disposed in the middle of the roof of the autonomous vehicle.

Step 22: obtaining a point cloud image according to the detection data of the at least one wall.

It is well known that the ladar uses a time of flight (TOF) technology. Therefore, the autonomous vehicle emits a laser beam through a ladar installed on the vehicle, and calculates a relative distance between an obstacle and itself according to return time of the laser beam upon encounter with the obstacle. The laser beam can accurately measure the relative distance between contour edges of an object in the field of view and the autonomous vehicle. This contour information may form a point cloud image.

In the present embodiment, the detection data of the at least one detected wall is integrated, that is, all the detection data may form a point cloud image.

Exemplarily, for the detection data of the left wall detected by the first ladar disposed in the left front of the autonomous vehicle, since the wall is a plane, the point cloud image corresponding to the detection data of the left wall is a line.

Step 23: judging, according to the point cloud image, whether an installation position of the ladar is accurate.

Exemplarily, in the present embodiment, the autonomous vehicle first needs to find a reference object before judging whether the installation position of the ladar is accurate. For example, the point cloud image may be presented in a visualization interface, and it is determined, according to a presenting manner of the point cloud image, whether the installation position of the ladar is accurate.

Therefore, in the present embodiment, before Step 23, the method may further include the following step:

presenting the point cloud image in a visualization interface.

In the present embodiment, after the point cloud image corresponding to the detection data of the at least one wall is presented in the visualization interface, it is judged, according to the shape of the point cloud image in the visualization interface or the positional relationship with the visualization interface, whether the installation position of the ladar is accurate.

It should be noted that, in the present embodiment, if the point cloud image presented on the visualization interface is not a top view, the point cloud image is firstly adjusted to a top view, so that it is easier to judge whether a wall indicated by the point cloud image is parallel to a boundary of the visualization interface on the same side as the wall, improving judgment accuracy.

Figure 3:
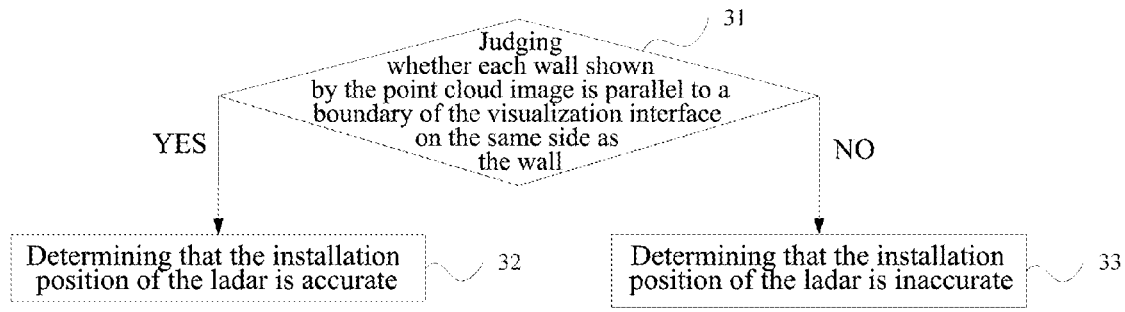
FIG. 3 is a schematic flowchart illustrating a second embodiment of a position detecting method for a vehicle ladar according to an embodiment of the present application.
Figure 5:
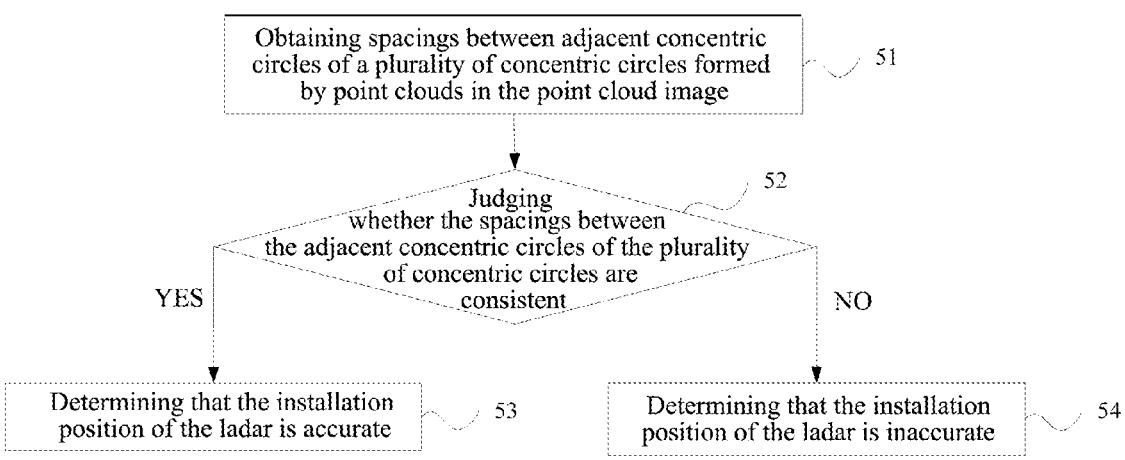
FIG. 5 is a schematic flowchart illustrating a third embodiment of a position detecting method for a vehicle ladar according to an embodiment of the present application.

For specific implementations of this step, reference may be made to the following description of the embodiment shown in FIG. 3 or the embodiment shown in FIG. 5, and details are not described herein again.

The position detecting method for the vehicle ladar provided in the embodiment of the present application allows for detecting, through a ladar disposed on an autonomous vehicle, detection data of at least one wall of an interior room in which the autonomous vehicle is located, obtaining a point cloud image according to the detection data of the at least one wall, and finally judging, according to the point cloud image, whether an installation position of the ladar is accurate. According to the technical solution, it is possible to accurately detect whether the installation position of the ladar is accurate, provide a prerequisite for calibration of the installation position of the ladar, and improve detection accuracy of the ladar for obstacles around the autonomous vehicle.

Exemplarily, based on the foregoing embodiment, as an example, FIG. 3 is a schematic flowchart illustrating a second embodiment of a position detecting method for a vehicle ladar according to an embodiment of the present application. As shown in FIG. 3, in the present embodiment, Step 23 (judging, according to the point cloud image, whether the installation position of the ladar is accurate) described above can be implemented by the following steps:

Step 31: judging whether each wall shown by the point cloud image is parallel to a boundary of the visualization interface on the same side as the wall; if yes, proceed with Step 32 and if no, proceed with Step 33.

Optionally, in the present embodiment, after the point cloud image detected by a certain ladar is presented in the visualization interface, the number of walls and positions thereof indicated by the point cloud image can be determined, and then judgment is made according to a positional relationship of each wall shown by the point cloud image with a boundary of the visualization interface on the same side as the wall.

Exemplarily, in the present embodiment, the position of the autonomous vehicle in the interior room is first parallel to the wall, and the visualization interface on the autonomous vehicle is also parallel to each wall of the interior room. Therefore, if the installation position of the ladar is accurate, each wall shown by the point cloud image detected from the ladar should be parallel to the boundary of the visualization interface on the same side as the wall.

Figure 4:
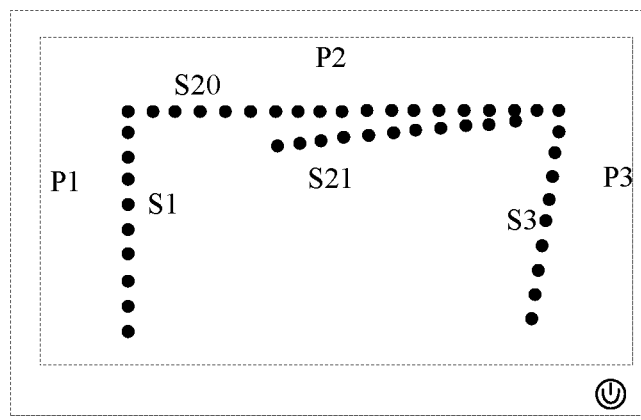
FIG. 4 is a schematic diagram showing distribution of walls shown by a point cloud image on a visualization interface.

For example, FIG. 4 is a schematic diagram showing distribution of walls shown by a point cloud image on a visualization interface. As shown in FIG. 4, a point cloud image detected by the first ladar installed in the left front of the autonomous vehicle shows a left wall S1 and a front wall S20, and a point cloud image detected by the second ladar installed in the right front of the autonomous vehicle shows a right wall S3 and the front wall S20, and thus whether the installation position of the first ladar is accurate can be judged according to whether the left wall S1 is parallel to a left boundary P1 of the visualization interface and whether the front wall S20 is parallel to a front boundary P2 of the visualization interface; similarly, whether the installation position of the second ladar is accurate can be judged according to whether the right wall S3 is parallel to a right boundary P3 of the visualization interface and whether the front wall S21 is parallel to a front boundary P2 of the visualization interface.

Step 32: determining that the installation position of the ladar is accurate.

In the present embodiment, it is determined that the installation position of the ladar is accurate if each wall shown by the point cloud image is parallel to a boundary of the visualization interface on the same side as the wall.

For example, referring to FIG. 4 above, in the present embodiment, if it is determined that the left wall S1 is parallel to the left boundary P1 of the visualization interface and the front wall S20 is parallel to the front boundary P2 of the visualization interface, that is, all the walls shown by the point cloud image obtained by the first ladar are parallel to the boundaries on the same side as them, and thus it can be determined that the installation position of the ladar is accurate.

Step 33: determining that the installation position of the ladar is inaccurate.

In the present embodiment, it is determined that the installation position of the ladar is inaccurate if there is a wall among all walls shown by the point cloud image that is not parallel to the boundary of the visualization interface on the same side as the wall.

For example, referring to FIG. 4 above, in the present embodiment, if it is determined that the right wall S3 is not parallel to the right boundary P3 of the visualization interface and/or the front wall S21 is not parallel to the front boundary P2 of the visualization interface, that is, there is a phenomenon that all the walls shown by the point cloud image obtained by the second ladar are not parallel to the boundaries on the same side as them, and thus it can be determined that the installation position of the ladar is inaccurate.

The position detecting method for the vehicle ladar provided in the embodiment of the present application allows for judging whether each wall shown by the point cloud image is parallel to a boundary of the visualization interface on the same side as the wall, determining that the installation position of the ladar is accurate if each wall shown by the point cloud image is parallel to the boundary of the visualization interface on the same side as the wall, and determining that the installation position of the ladar is inaccurate if there is a wall among all walls shown by the point cloud image that is not parallel to the boundary of the visualization interface on the same side as the wall. The technical solution allows for comparing a wall shown by the point cloud image with a boundary of the visualization interface, the implementation scheme is simple and easy to implement, and detection accuracy is high.

Exemplarily, based on the foregoing embodiment, as another example, FIG. 5 is a schematic flowchart illustrating a third embodiment of a position detecting method for a vehicle ladar according to an embodiment of the present application. As shown in FIG. 5, In the present embodiment, Step 23 (judging, according to the point cloud image, whether the installation position of the ladar is accurate) described above can be implemented by the following steps:

Step 51: obtaining spacings between adjacent concentric circles of a plurality of concentric circles formed by point clouds in the point cloud image.

Exemplarily, each ladar can emit a plurality of scan lines to detect an obstacle having a different distance from the autonomous vehicle. Therefore, in the present embodiment, each ladar can be controlled to emit a plurality of scan lines, so that point clouds in the point cloud image formed on the visualization interface can form concentric circles with different radii. Correspondingly, the spacings between the adjacent concentric circles of the plurality of concentric circles can be calculated and obtained, which are used as a basis for judging whether the installation position of the ladar is accurate.

Step 52: judging whether the spacings between the adjacent concentric circles of the plurality of concentric circles are consistent; if yes, proceed with Step 53 and if no, proceed with Step 54.

Generally, point clouds corresponding to a plurality of scan lines emitted by the same ladar can form a series of concentric circles, and spacings between adjacent ones of the concentric circles are consistent. Therefore, in the present embodiment, after the spacings between the adjacent ones of the concentric circles formed by the point clouds in the point cloud image are acquired, it can be judged whether all the spacings are consistent.

Step 53: determining that the installation position of the ladar is accurate.

Exemplarily, in the present embodiment, it is determined that the installation position of the ladar is accurate if the spacings between the adjacent concentric circles of the plurality of concentric circles are consistent.

Step 54: determining that the installation position of the ladar is inaccurate.

Exemplarily, it is determined that the installation position of the ladar is inaccurate if the spacings between the adjacent concentric circles of the plurality of concentric circles are inconsistent.

Figure 6:
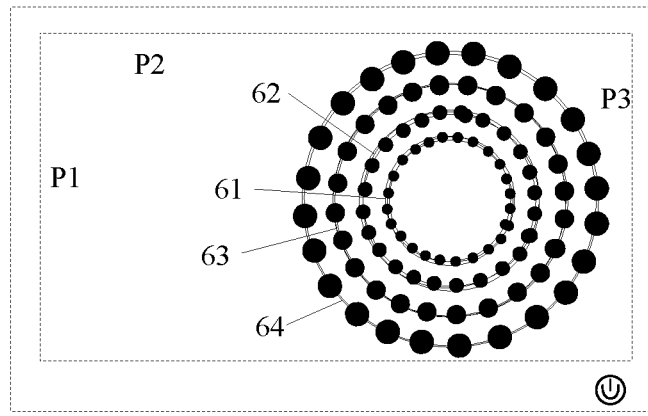
FIG. 6 is a schematic diagram illustrating a plurality of concentric circles formed by point clouds in a point cloud image.

Exemplarily, FIG. 6 is a schematic diagram illustrating a plurality of concentric circles formed by point clouds in a point cloud image. As shown in FIG. 6, in the present embodiment, for the point cloud image detected by the first ladar installed in the left front of the autonomous vehicle, exemplarily, it is assumed that the point clouds in the point cloud image constitute a concentric circle 61, a concentric circle 62, a concentric circle 63 and a concentric circle 64, and the like.

In the present embodiment, it can be judged whether the installation position of the first ladar is accurate by obtaining distances between adjacent concentric circles, for example, a spacing between the concentric circle 61 and the concentric circle 62 is d1, a spacing between the concentric circle 62 and the concentric circle 63 is d2, and a spacing between the concentric circle 63 and the concentric circle 64 is d3, and by judging whether the spacing d1, the spacing d2, and the spacing d3 are consistent.

That is, if the spacing d1, the spacing d2, and the spacing d3 are identical, it indicates that the installation position of the first ladar is accurate; otherwise it indicates that the installation position of the first ladar is inaccurate.

The position detecting method for the vehicle ladar provided in the embodiment of the present application allows for obtaining spacings between adjacent concentric circles of a plurality of concentric circles formed by point clouds in the point cloud image, and judging whether the spacings between the adjacent concentric circles of the plurality of concentric circles are consistent, if yes, determining that the installation position of the ladar is accurate, and if no, determining that the installation position of the ladar is inaccurate. In the technical solution, whether the installation position of the ladar is accurate is judged by whether the spacings between the concentric circles formed by the point clouds in the point cloud image are consistent, detection accuracy is improved, and efficiency is high.

Figure 7:
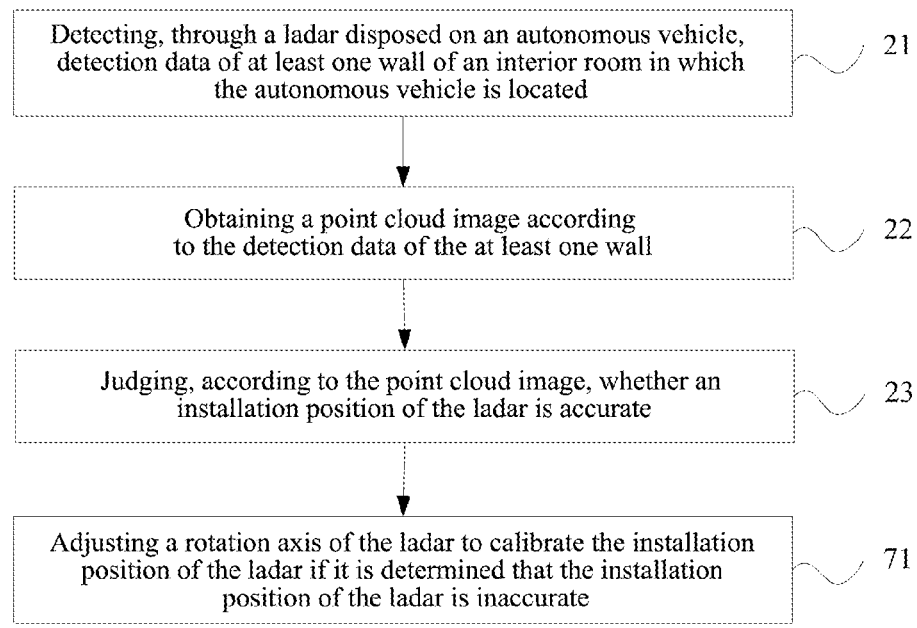
FIG. 7 is a schematic flowchart illustrating a fourth embodiment of a position detecting method for a vehicle ladar according to an embodiment of the present application.

Exemplarily, based on any of the above embodiments, FIG. 7 is a schematic flowchart illustrating a fourth embodiment of a position detecting method for a vehicle ladar according to an embodiment of the present application. As shown in FIG. 7, in the present embodiment, after Step 23 (determining, according to the point cloud image, whether the installation position of the ladar is accurate) described above, the method may further include the following steps:

Step 71: adjusting a rotation axis of the ladar to calibrate the installation position of the ladar if it is determined that the installation position of the ladar is inaccurate.

Optionally, in the present embodiment, when it is determined that the installation position of the ladar installed on the autonomous vehicle is inaccurate, the installation position of the ladar needs to be calibrated to ensure driving safety of the autonomous vehicle.

For example, when using the scheme that whether each wall shown by the point cloud image is parallel to the boundary of the visualization interface on the same side as the wall to detect whether the installation position of the ladar is accurate, if the installation position of the first ladar installed in the left front of the autonomous vehicle is inaccurate, the rotation axis of the ladar can be adjusted so that the left wall in the point cloud image is parallel to the left edge of the visualization interface and the front wall in the point cloud image is parallel to the upper edge of the visualization interface to make the installation position of the ladar accurate.

As another example, generally, the inclined direction of the rotation axis of the ladar determines that a spacing between concentric circles in this direction is narrow. Therefore, when spacings between adjacent concentric circles of a plurality of concentric circles formed by point clouds in the point cloud image are used to detect whether the installation position of the ladar is accurate, the position cloud image can be observed to first determine position information of a narrower spacing in the point cloud image, and adjust the rotation axis of the ladar according to the position information, so that the concentric circles in the point cloud image are equally spaced to make the installation position of the ladar accurate.

The position detecting method for the vehicle ladar provided in the present embodiment allows for, when it is determined that the installation position of the ladar is inaccurate, adjusting the rotation axis of the ladar to calibrate the installation position of the ladar, which realizes position calibration of the ladar on the autonomous vehicle, improves detection accuracy of the ladar for obstacles around the autonomous vehicle, and improves driving accuracy of the autonomous vehicle.

The following describes device embodiments of the present application, which may be used to implement the method embodiments of the present application. For details not disclosed in the device embodiments of the present application, please refer to the method embodiments of the present application.

Figure 8:
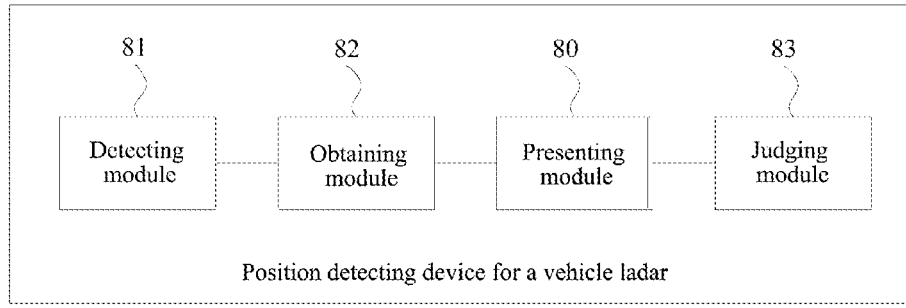
FIG. 8 is a schematic structural diagram illustrating a first embodiment of a position detecting device for a vehicle ladar according to an embodiment of the present application.

FIG. 8 is a schematic structural diagram illustrating a first embodiment of a position detecting device for a vehicle ladar according to an embodiment of the present application. The device can be integrated in an autonomous vehicle. As shown in FIG. 8, the device may include: a detecting module 81, an obtaining module 82 and a judging module 83.

Among them, the detecting module 81 is configured to detect, through a ladar disposed on an autonomous vehicle, detection data of at least one wall of an interior room in which the autonomous vehicle is located;

the obtaining module 82 is configured to obtain, according to the detection data of the at least one wall, a point cloud image; and the judging module 83 is configured to judge, according to the point cloud image, whether an installation position of the ladar is accurate.

Exemplarily, in a possible design of the embodiment, as shown in FIG. 8, the device may further include: a presenting module 80.

The presenting module 80 is configured to: before the judging module 83 judges, according to the point cloud image, whether the installation position of the ladar is accurate, present the point cloud image in a visualization interface.

Figure 9:
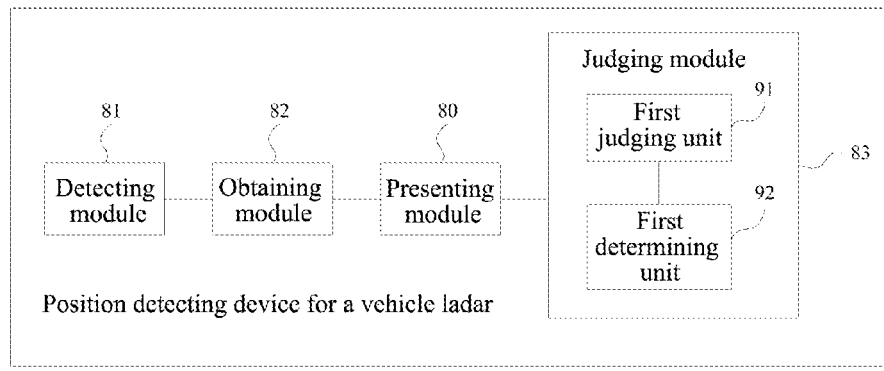
FIG. 9 is a schematic structural diagram illustrating a second embodiment of a position detecting device for a vehicle ladar according to an embodiment of the present application.

Exemplarily, as an example, FIG. 9 is a schematic structural diagram illustrating a second embodiment of a position detecting device for a vehicle ladar according to an embodiment of the present application. As shown in FIG. 9, in the present embodiment, the above judging module 83 may include: a first judging unit 91 and a first determining unit 92.

Among them, the first judging unit 91 is configured to judge whether each wall shown by the point cloud image is parallel to a boundary of the visualization interface on the same side as the wall; and the first determining unit 92 is configured to determine that the installation position of the ladar is accurate when each wall shown by the point cloud image is parallel to the boundary of the visualization interface on the same side as the wall, and determine that the installation position of the ladar is inaccurate when there is a wall among all walls shown by the point cloud image that is not parallel to the boundary of the visualization interface on the same side as the wall.

Figure 10:
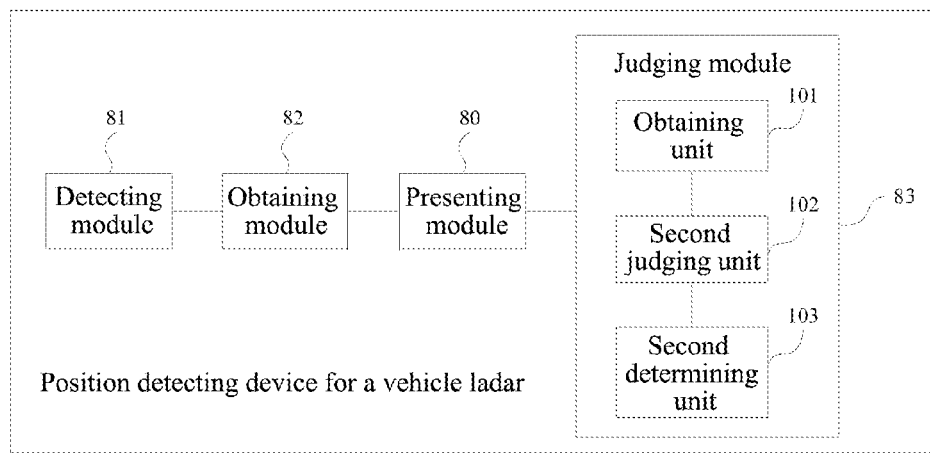
FIG. 10 is a schematic structural diagram illustrating a third embodiment of a position detecting device for a vehicle ladar according to an embodiment of the present application.

Exemplarily, as another example, FIG. 10 is a schematic structural diagram illustrating a third embodiment of a position detecting device for a vehicle ladar according to an embodiment of the present application. As shown in FIG. 10, in the present embodiment, the above judging module 83 may include: an obtaining unit 101, a second judging unit 102 and a second determining unit 103.

Among them, the obtaining unit 101 is configured to obtain spacings between adjacent concentric circles of a plurality of concentric circles formed by point clouds in the point cloud image;

the second determining unit 102 is configured to judge whether the spacings between the adjacent concentric circles of the plurality of concentric circles are consistent; and the second determining unit 103 is configured to determine that the installation position of the ladar is accurate when the spacings between the adjacent concentric circles of the plurality of concentric circles are consistent, and determine that the installation position of the ladar is inaccurate when the spacings between thee adjacent concentric circles of the plurality of concentric circles are inconsistent.

Figure 11:
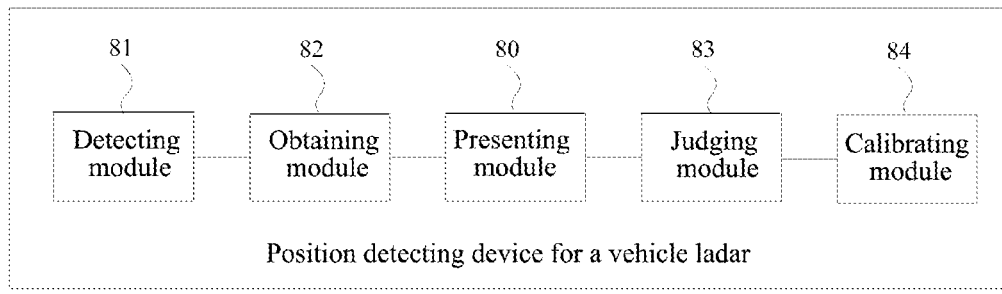
FIG. 11 is a schematic structural diagram illustrating a fourth embodiment of a position detecting device for a vehicle ladar according to an embodiment of the present application.

Exemplarily, based on the foregoing embodiment, FIG. 11 is a schematic structural diagram illustrating a fourth embodiment of a position detecting device for a vehicle ladar according to an embodiment of the present application. As shown in FIG. 11, in the present embodiment, the device further includes: a calibrating module 84.

The calibrating module 84 is configured to: after the judging module 84 judges, according to the point cloud image, whether the installation position of the ladar is accurate, adjust a rotation axis of the ladar to calibrate the installation position of the ladar if it is determined that the installation position of the ladar is inaccurate, The device provided in the embodiment of the present application can be used to perform the method in the embodiments shown in FIG. 2 to FIG. 7; implementation principles and technical effects therebetween are similar, and details are not described herein again.

It should be noted that the division of the modules of the above device is only a division of logical functions which may be integrated into one physical entity in whole or in part during an actual implementation or may be physically separated. Moreover, these modules can all be implemented by software in a form of calling processing elements; or all of them can be implemented in a form of hardware; or some modules can be implemented by software in a form of calling processing components, and some modules are implemented in a form of hardware. For example, the determining module may be a separately arranged processing element, or may be integrated in a particular chip of the above device, in addition, may be stored in a memory of the above device in the form of program codes, and functions of the above determining module are called by a particular processing element of the above device. Implementations of other modules are similar thereto. In addition, all or part of these modules can be integrated or implemented independently. The processing elements described herein can be an integrated circuit with signal processing capabilities. In the implementation process, each step of the above method or each of the above modules may be completed by an integrated logic circuit of hardware in the processor element or an instruction in a form of software.

For example, the above modules may be one or more integrated circuits configured to implement the above method, such as one or more application specific integrated circuits (ASIC), or one or more digital signal processors (DSP), or one or more field programmable gate arrays (FPGA), and the like. For another example, when one of the above modules is implemented in a form of a processing element scheduling program codes, the processing element can be a general purpose processor, such as a central processing unit (CPU) or other processor that can invoke the program codes. For another example, these modules can be integrated and implemented in a form of a system-on-a-chip (SOC).

In the above embodiments, it may be implemented in whole or in part by software, hardware, firmware, or any combination thereof. When implemented in software, it may be implemented in whole or in part in the form of a computer program product. The computer program product includes one or more computer instructions. When the computer program instructions are loaded and executed on a computer, the processes or functions described in accordance with embodiments of the present application are generated in whole or in part. The computer can be a general purpose computer, a special purpose computer, a computer network, or other programmable device. The computer instructions can be stored in a computer readable storage medium or transmitted from one computer readable storage medium to another computer readable storage medium, for example, the computer instructions can be transmitted from one website, computer, server or data center to another website, computer, server or data center in a wired manner (for example, a coaxial cable, an optic fiber, a digital subscriber line (DSL)) or a wireless manner (for example, infrared, radio, microwave, etc.). The computer readable storage medium can be any available medium that can be accessed by a computer or a data storage device such as an integrated server, data center, or the like that includes one or more available media. The available medium may be a magnetic medium (for example, a floppy disk, a hard disk, a magnetic tape), an optical medium (for example, a DVD), or a semiconductor medium (for example, a solid state disk (SSD)) or the like.

Figure 12:
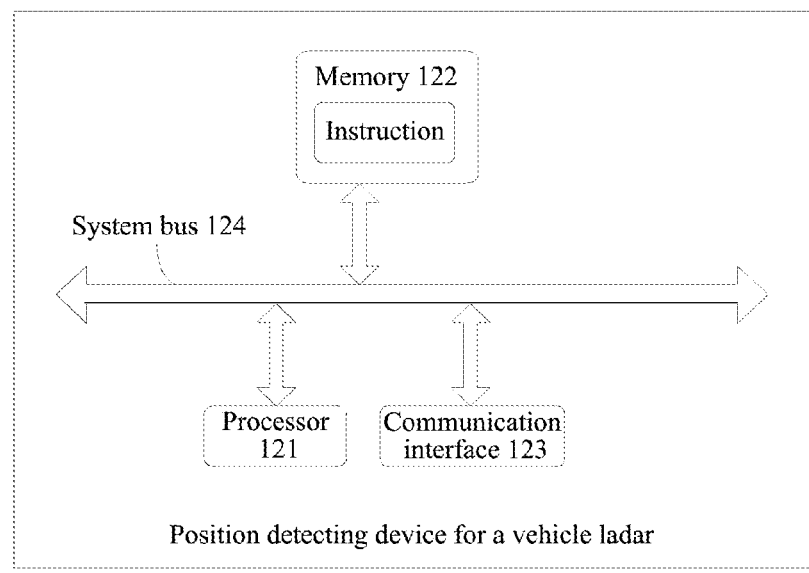
FIG. 12 is a schematic structural diagram illustrating a fifth embodiment of a position detecting device for a vehicle ladar according to an embodiment of the present application.

FIG. 12 is a schematic structural diagram illustrating a fifth embodiment of a position detecting device for a vehicle ladar according to an embodiment of the present application. As shown in FIG. 12, the device may include: a processor 121, a memory 122, a communication interface 123 and a system bus 124, where the memory 122 and the communication interface 123 are connected to the processor 121 via the system bus 124 and complete communication with each other. The memory 122 is configured to store computer executable instructions, the communication interface 123 is configured to communicate with other devices, and the processor 121, when executing the computer program, implements the technical solutions of the embodiments shown in FIG. 2 to FIG. 7.

The system bus mentioned in FIG. 12 may be a peripheral component interconnect (PCI) bus or an extended industry standard architecture (EISA) bus. The system bus can be divided into an address bus, a data bus, a control bus, and the like. For ease of representation, only one thick line is shown in the figure, but it does not mean that there is only one bus or one type of bus. The communication interface is used to implement communications between a database access device and other device such as a client, a read-write library, and a read-only library. The memory may include a random access memory (RAM), and may also include a non-volatile memory, such as at least one disk memory.

The above processor may be a general-purpose processor, including a central processing unit CPU, a network processor (NP), etc.; or may be a digital signal processor DSP, an application specific integrated circuit ASIC, a field programmable gate array FPGA, or other programmable logic device, discrete gate, transistor logic device, or discrete hardware component.

Optionally, the embodiment of the present application further provides a storage medium, where the storage medium is stored with instructions which, when running on the computer, cause the computer to perform the method as described above in the embodiments shown in FIG. 2 to FIG. 7.

Optionally, the embodiment of the present application further provides a chip for running an instruction, where the chip is configured to perform the method as described above in the embodiments shown in FIG. 2 to FIG. 7.

The embodiment of the present application further provides a program product, where the program product includes a computer program which is stored in a storage medium, at least one processor can read the computer program from the storage medium, and the at least one processor, when executing the computer program, can implement the method as described above in the embodiments shown in FIG. 2 to FIG. 7.

In the present application, "at least one" means one or more, and "a plurality of" means two or more. The expression such as "and/or" is intended to describe an association between associated objects, which indicates that there may be three relationships, for example, A and/or B may indicate presence of A only, of both A and B, and of B only, where either A or B may be in a singular or plural form. The character "/" generally indicates that contextual objects have an "or" relationship; in the formula, the character "I" indicates that the contextual objects have a "divide" relationship. "At least one of the following" or a similar expression thereof refers to any combination of these items, including any combination of a single item or a plurality of items. For example, at least one of a, b, or c may represent: a, b, c, a-b, a-c, b-c, or a-b-c, where a, b, c may be in a singular or plural form.

It can be understood that various numbers involved in the embodiments of the present application are not intended to limit the scope of the embodiments of the present application, but are distinguished for ease of description.

It can be understood that, in the embodiments of the present application, the sequence numbers of the above processes do not mean an order of execution, and the order of execution of each process should be determined by its function and internal logic, and should not constitute any limitation on the implementation process of the embodiments of the present application.

Finally, it should be noted that the above embodiments are only used to explain the technical solutions of the present application, but not to limit the present application; although the present application has been described in detail with reference to the foregoing embodiments, those of ordinary skill in the art should understand that they can still make modifications to the technical solutions described in the foregoing embodiments, or make equivalent replacements to some or all of the technical features; however, these modifications or replacements do not make the essence of the corresponding technical solutions depart from the scope of the technical solutions of the embodiments of the present application.

What is claimed is:

1. A position detecting method for a vehicle ladar, comprising:
   detecting, through a ladar disposed on an autonomous vehicle, detection data of at least one wall of an interior room in which the autonomous vehicle is located;
   obtaining, according to the detection data of the at least one wall, a point cloud image; and
   judging, according to the point cloud image, whether an installation position of the ladar is accurate,
   wherein the judging, according to the point cloud image, whether the installation position of the ladar is accurate comprises:
   obtaining spacings between adjacent concentric circles of a plurality of concentric circles formed by point clouds in the point cloud image;
   judging whether the spacings between the adjacent concentric circles of the plurality of concentric circles are consistent;
   determining that the installation position of the ladar is accurate if the spacings between the adjacent concentric circles of the plurality of concentric circles are consistent; and determining that the installation position of the ladar is inaccurate if the spacings between the adjacent concentric circles of the plurality of concentric circles are inconsistent.

2. The method according to claim 1, wherein before the judging, according to the point cloud image, whether the installation position of the ladar is accurate, the method comprises:
presenting the point cloud image in a visualization interface.

3. The method according to claim 1, wherein after the judging, according to the point cloud image, whether the installation position of the ladar is accurate, the method further comprises:
if it is determined that the installation position of the ladar is inaccurate, adjusting a rotation axis of the ladar to calibrate the installation position of the ladar.

4. A position detecting device for a vehicle ladar, comprising a processor, a memory and a computer program stored on the memory and executable on the processor, wherein the processor, when executing the program, being configured to:
detect, through a ladar disposed on an autonomous vehicle, detection data of at least one wall of an interior room in which the autonomous vehicle is located;
obtain, according to the detection data of the at least one wall, a point cloud image; and
judge, according to the point cloud image, whether an installation position of the ladar is accurate,
wherein the processor is further configured to:
obtain spacings between adjacent concentric circles of a plurality of concentric circles formed by point clouds in the point cloud image;
judge whether the spacings between the adjacent concentric circles of the plurality of concentric circles are consistent;
determine that the installation position of the ladar is accurate if the spacings between the adjacent concentric circles of the plurality of concentric circles are consistent; and
determine that the installation position of the ladar is inaccurate if the spacings between the adjacent concentric circles of the plurality of concentric circles are inconsistent.

5. The device according to claim 4, wherein the processor is further configured to:
present the point cloud image in a visualization interface.

6. The device according to claim 4, wherein the processor is further configured to:
if it is determined that the installation position of the ladar is inaccurate, adjust a rotation axis of the ladar to calibrate the installation position of the ladar.

7. A storage medium having stored therein an instruction which, when executed by a computer, implements the steps of:
detecting, through a ladar disposed on an autonomous vehicle, detection data of at least one wall of an interior room in which the autonomous vehicle is located;
obtaining, according to the detection data of the at least one wall, a point cloud image; and
judging, according to the point cloud image, whether an installation position of the ladar is accurate,
wherein the storage medium further comprises computer execution instruction which, when executed by a processor, implements the steps of:
obtaining spacings between adjacent concentric circles of a plurality of concentric circles formed by point clouds in the point cloud image;
judging whether the spacings between the adjacent concentric circles of the plurality of concentric circles are consistent;
determining that the installation position of the ladar is accurate if the spacings between the adjacent concentric circles of the plurality of concentric circles are consistent; and
determining that the installation position of the ladar is inaccurate if the spacings between the adjacent concentric circles of the plurality of concentric circles are inconsistent.

8. The storage medium according to claim 7, wherein the storage medium further comprises computer execution instruction which, when executed by a processor, implements the step of:
presenting the point cloud image in a visualization interface.

9. The storage medium according to claim 7, wherein the storage medium further comprises computer execution instruction which, when executed by a processor, implements the steps of:
if it is determined that the installation position of the ladar is inaccurate, adjusting a rotation axis of the ladar to calibrate the installation position of the ladar.

* * * * *